Jan. 5, 1960 H. J. EVANS 2,920,232

DISPLAY DEVICE WITH STORAGE

Filed Aug. 18, 1958

INVENTOR:
HOWARD J. EVANS,
BY Richard V. Lang
HIS ATTORNEY.

United States Patent Office 2,920,232

Patented Jan. 5, 1960

2,920,232

DISPLAY DEVICE WITH STORAGE

Howard Joseph Evans, Fayetteville, N.Y., assignor to General Electric Company, a corporation of New York Application August 18, 1958, Serial No. 755,564

11 Claims. (Cl. 315—71)

The present invention relates to display devices having storage and has a particular object thereof the provisions of an improved storing device of the type employing a photoconductive optical input and an electroluminescent optical output.

Storing display devices of the type herein contemplated may be used to display large images when a full tone or binary type of display is desired. The optical signal input may take either the form of an individual writing beam as that used in a conventional radar plan position indicator, or a full two dimensional optical image momentarily applied to the input surface of the panel. The panel is intrinsically adapted for large size displays, as for instance three feet by three feet, and larger, having line intervals or cell dimensions on the order of 1/16 of an inch. In general, the display panels may also be made quite small with some sacrifice in the total stored information due to the minimum achievable cell dimensions. The maximum panel size attainable is well beyond that currently through feasible for cathode ray tubes.

A principal desirable feature in the majority of storage panels is the reduction in size of the individual cells so as to increase the information capacity or definition of a stored image. In general, cell size reduction increases the problems of maintaining a high input sensitivity and a high light output. The decrease in cell size is usually accompanied by undesired reductions in the percentages of effective input and output surfaces, reductions in the internal light feedback ratios in the cell and by a reduction in optical isolation between cells. In addition to the foregoing difficulties, the construction and assembly of such panels is extremely difficult because of the small size of the elements and their large numbers.

It is accordingly another object of the present invention to provide a new and improved storing display device having improved information capacity, improved intercell isolation and improved sensitivity.

These and other objects of the present invention are achieved by the use of a thin sheet of transparent material forming the base member of the panel. The base has a lattice of thin light opaque walls which extend substantially through the thickness dimension of the base to define an array of optically isolated individual cells. An electrical conductor is formed on one surface of the base making a first common electrical connection to each of the cells without obstructing the admission of light to each of said cells. Obstruction may be avoided by making the conductor coextensive with the intercell walls. A second conductor is applied to each of the cells penetrating the base and preferably centrally located in each cell. A photoconductive layer is then applied on the first base surface forming a path connecting the penetrating conductors of each cell to the first common electrical connection. On the other surface of the base, which may be of glass, electrically independent transparent conductors coat each cell. These latter conductors also make electrical contact with the penetrating conductor. Overlaying the transparent conductors is an electroluminescent layer applied thereon. Finally, a second common electrical connection is formed by means of a second transparent conductor applied upon the electroluminescent layer.

In a preferred construction, optically sensitive glass of the kind which may be selectively darkened upon exposure to light to create regions which are both opaque and also responsive to selective etching is used as the base of the display panel.

In a second construction, in order to facilitate selective erasure, the photoconductor is formed of two serially connected photoconductors having differing spectral sensitivities. One is made sensitive to signal radiation and the other to a "keep alive" radiation. Upon locally blocking the "keep alive" radiation, selective erasure may be achieved.

The features of the invention which are believed to be novel are set forth with particularity in the appended claims. The invention, itself, however, both as to its organization and method of operation, together with further objects and advantages thereof, may best be understood by reference to the following description when taken in connection with the drawings, wherein:

Figure 1:
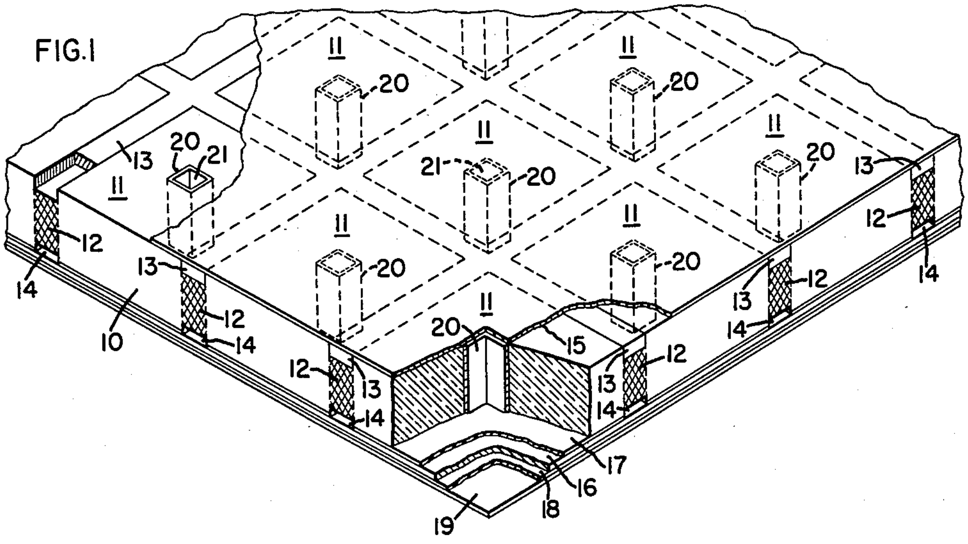
Figure 1 is a perspective structural view of a first storage display panel in accordance with the present invention.
Figure 2:
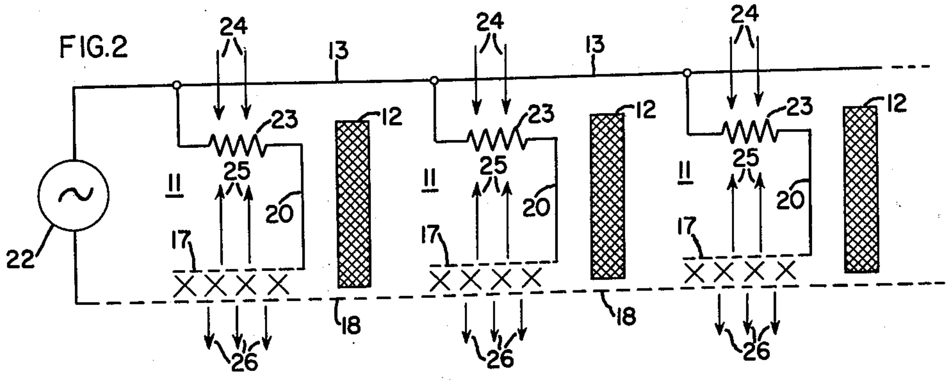
Figure 2 is a schematic electrical diagram of the display panel shown in Figure 1.

Referring now to Figures 1 and 2, there is shown a storing display device which is a first embodiment of the present invention. It comprises a rigid base 10 having a mosaic of regularly spaced cells 11 arranged thereon. The rigid base 10 is of a transparent insulative material and preferably may be of a glass of the kind which after exposure to ultra-violet radiation darkens and is thereupon subject to selective etching. A glass having this property is known as "Fotoform" glass and is a product of the Corning Glass Company of New York State. In typical applications, the base 10 may be from .025 to .075 inch in thickness.

The cells of the display device are defined by a lattice or network of thin opaque walls 12 which extend substantially through the thickness dimension of the panel. Substantially coextensive with the walls 12 are a first set of conductors 13 set into grooves formed in the upper surface of the panel (as illustrated in Figure 1). The conductors 13 form a first common terminal to all of the cells. On the under surface of the base (as illustrated in the drawing) a similarly coextensive, but shallower set of grooves is provided. The wall thickness may vary from .006 to .015 inch depending upon the cell size wall opaqueness and optical isolation desired. The width of the conductor 13 may be substantially equal to the wall thickness and may typically be .005 inch in depth, depending upon the size and current requirements of the panel. The grooves on the under surface of the panel may be shallower than the grooves formed into the upper surface, and need only constitute roughened regions deep enough to facilitate formation of independent conductive layers for each of the cells, as will be explained below.

Applicant's storage device, as mentioned earlier, is of the type wherein a photoconductive element is electrically connected in series with an electroluminescent element. In this device, each cell has these functioning parts and is arranged to operate independently of the other cells. The photoconductive layer is shown at 15. It is applied over the upper surface of the base 10, coating both the base 10 and the conductors 13. While it is usually convenient to make the photoconductive coating continuous over the entire panel, the coating may be made only coextensive with the individual cells. In any case, it is necessary that there be good electrical contact around the periphery of the portion of the photoconductor included in each cell with the conductors 13 surrounding the cell.

The electroluminescent layer is shown at 16, applied upon the under side of the base 10 with a single layer 17 intervening. The electroluminescent layer 16 may also be continuous for simplicity in deposition. This measure also increases the total amount of effective light radiating surface. Electrical fields for operation of the electroluminescent layer are provided by the transparent conductive layers 17 and 18. The transparent conductive layer 17, placed directly on the under surface of the glass base 10, is coextensive with the individual cells 11, being bounded by the roughened grooves 14 and thus not bridging or inter-connecting the individual cells. The transparent conductive layer 18 adjacent the other surface of the phosphor is continuous over the under surface of the panel, and forms a second common terminal to the panel. Since the surface of the electroluminescent layer is usually irregular, it is generally preferable to form the outer transparent conductive layer 18 upon a smooth more nearly self-supporting member such as the element 19, which is a thin film of transparent plastic material.

Series connections between the electroluminescent layer and the photoconductor are provided by means of the conductors 20, formed upon the walls of the perforations 21. As illustrated in Figure 1, each cell is provided with a centrally placed opening of rectangular or cylindrical cross section. The conductors 20 coating the walls of the openings 21 are arranged to make good contact on their upper edges with the photoconductive layers 15 and on their lower edges with the segmented conductive layers 17.

Figure 2 is a schematic illustration of the electrical connections to the panel and its energization. Energization of the panel is provided by means of the source 22 of alternating electrical potentials. The source may be of several hundred volts alternating voltage, the magnitude of the voltage depending upon the desired panel brightness. Typical values lie between 200 and 500 volts. The operating frequency may have a typical value of 2,000 cycles. In general, the higher frequencies give brighter images, but at a cost of greater losses from the shunting effects due to distributed capacities. The source 22 is coupled between the common terminal formed by the conductors 13 forming the first common panel conductor and the continuous transparent conductor 18 forming the external connection to the electroluminescent elements and second common panel conductor. The photoconductive elements of each cell are shown at 23 electrically connected in series with the electroluminescent elements by means of the cylindrical conductors 20, which cylindrical conductors 20 are connected to the internal electrode 17 of the electroluminescent elements. The optical barriers between the cells are shown at 12. The path of input radiation is shown by the arrows 24 indicating the application of a signal to the photoconductive elements 23. The internal optical radiation path is shown by the arrows 25 directed to indicate irradiation of the inner surface of the photoconductor by the inner surface of the electroluminescent element. The main optical output of the panel is shown by the arrows 26 indicating radiation from the outer surface of the electroluminescent element.

The panel operates in the following manner. The source 22 provides an alternating potential across the series circuits formed by the individual photoconductive elements and the electroluminescent elements forming the parallelly connected cells. When the panel is in total darkness, the photoconductors are of high impedance thus permitting only a relatively small fraction (typically one tenth) of the total source voltage to appear across the terminals of the electroluminescent cells. The voltage at the electroluminescent cells is thus insufficient to cause operation of the electroluminescent elements and they remain dark. Upon the incidence of radiation upon the photo conductors, their impedances fall rapidly, typically through a range of one thousand to one, causing a major fraction of voltage output of the source to be applied directly across the electroluminescent elements. The elevation in applied voltage causes the electroluminescent elements to light up, producing both output radiation as shown at 26 and an internal feedback radiation as shown at 25. The existence of the feedback radiation 25 irradiating the photoconductive elements 23 holds their impedances at a low value and thus tends to keep the electroluminescent elements lighted. In this manner the panel remains in the same condition, storing the input information, even after the original input radiation 24 has been discontinued.

The structure of the first embodiment is very conveniently assembled. While different means of assembly may be employed, the foregoing methods have proven quite satisfactory. As mentioned earlier, the glass base 10 may be of "Fotoform" glass. This glass, as mentioned earlier, has the property of darkening upon exposure to ultra-violet radiation and heat treatment to create regions which are optically opaque and which may be selectively etched by hydrofluoric acid. In creating the opaque walls 12, the coextensive grooves, and central holes 21, this property may be utilized to advantage. Masks are prepared which are negatives of the plan view of the structure. After suitable exposure of the glass base through the negatives to ultra-violet radiation and heat treatment, darkened regions corresponding to these physical features are created. The glass base 10 is treated with hydrofluoric acid after each such exposure for etching out the desired holes and grooves.

After creation of the optical barriers and the physical formation of the glass base is completed, the various conductors, conductive layers and active coating may be applied. The first of these are the transparent conductors 17 applied to the under surface of the glass base 10. The material of the conductors 17 may be either tin oxide, or titanium oxide, the former being somewhat preferable because of its higher surface conductivity. In order to avoid electrical connection across the grooves between the various conductors 17, the grooves 14 are filled with alumina powder prior to application of the conductive compounds. The tin oxide is then deposited in conventional fashion over the continuous surface presented by the alumina filling the grooves 14 and the under surface of the glass base 10. After the tin oxide coating is properly formed and sintered to the glass, the alumina is removed.

Conduction in the upper grooves and holes 21 may be achieved by the use of "platinum bright," a product of the Hanovia Chemical and Manufacturing Company, Newark, New Jersey, which is sintered to the glass. Since high conduction is desired, the coating should be built up to a substantial thickness. In the conductor coating the holes 21, the conductive layer should extend well over the edges of the holes for good contact with the layers on the glass surfaces.

The photoconductive layer may be copper activated cadmium sulfide. It may be applied in form of a powder dusted on the upper surface of the glass base. In order to insure adhesion to the surface, the glass surface is usually rendered sticky by any of several known volatile substances such as "Vistanex-Xylene" solution, a product of the Enjay Company, Incorporated, New York City, New York. This material is then burned off upon sintering of the photoconductive layer to the glass. For mechanical protection and a reduction of sensitivity to humidity, the sintered photoconductor may finally be coated with a layer insulating moisture-inhibiting varnish.

The electroluminescent layer 16 is a copper activated zinc sulfide electroluminescent phosphor. It may be applied in well known fashion by spraying the under surface of the glass base. A typical thickness is .003 thousandths of an inch.

The transparent conductor 18 may be a thin conductive layer of gold evaporated upon a .001 inch sheet of transparent plastic material. The sheet, after having been wet on the gold surface with a self-drying plastic resin, is pressed against the phosphor while still wet in order to insure a tight bond between the two. Finally, the completed assembly is heated for a short period at a temperature in excess of the boiling point of water to drive off any entrapped water vapor.

An alternative construction of somewhat greater difficulty but providing better optical isolation between cells, is one in which the cell walls are fabricated of an opaque glass such as solder glass. "Fotoform" type glass may be employed as before for the base material. The glass base is now etched into deep grooves, which are then filled with the solder glass. The solder glass may then be selectively etched to form the desired grooves.

One may also employ alternate methods for the fabrication of the conductors 13 and 17 differing from those previously disclosed. In forming conductors 13 printed circuits techniques may be employed without resort to the indicated grooves. It is of course desirable that the conductors 13 be generaly in register with the inter-cell walls 12. The boundaries of the conductors 17 may be achieved by an alternate method also. For instance, a mask may be introduced defining the cell boundaries during the process of applying the transparent conductors 17.

The foregoing structure may also be executed employing a plastic base member. In such event methods of conductor formation and coating formation must be of types not requiring high temperatures. At the present time, higher temperature methods give somewhat better performance.

The foregoing arrangement is particularly advantageous from both an optical and electrical standpoint. From an optical standpoint, it may be observed that substantially all of the upper surface of the panel serves as a light gathering or signal sensing surface, and substantially all the undersurface of the panel serves as a light emitting surface. The principal portions of the surfaces not entering into active participation in these activities are those narrow regions coextensive with the cell walls and central apertures. The direct face to face placement of the electroluminescent layer with respect to the photoconductive layer provides a high order of feedback, leading to a high optical input sensitivity.

Electrical efficiency is also high. The use of relatively high order conductors on the upper surface of the glass base tends to maintain all portions of the surface at an equal potential. The method of electroding the photoconductive layer is also very efficient since the operating current flow is distributed over a large amount of the conductive surface in a manner tending to prevent excessive currents in localized portions of the photoconductor and thus increase the reliability of the individual cell units.

The structure described in Figures 1 and 2 is one in which erasure of a stored signal would ordinarily occur only upon the cessation of energizing potentials for the entire panel. If selective erasure is desired in a structure like that of Figures 1 and 2, one may reduce the amount of feedback and the normal signal level so that the individual cells of the device will not be operated, unless the signal is supplemented by an auxiliary source of light. This auxiliary source of light then performs a "keep alive" function. By this provision, one may selectively erase portions of the image stored upon the storing light panel by interposing a localized light barrier between the flooding light source and the cells of the panel.

Figure 3:
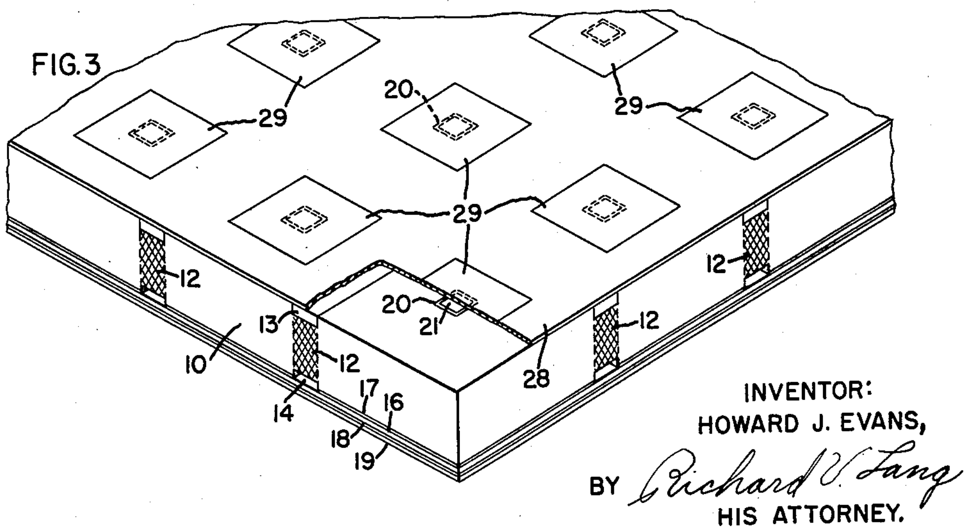
Figure 3 is a perspective structural view of a second storage display panel, having special provisions for achieving selective erasure.

A somewhat different approach to the problem of achieving selective erasure is provided by the novel arrangement illustrated in Figure 3 using two photoconductive materials. Here the panel is as before, save for a modification of the superconductive layer. The superconductive layer is now formed of two electrically continuous regions, one (28) forming a grid like network applied over and making electrical connection to the conductors 13, and the other (29) forming an array of squares applied over and making electrical connection with the central cell conductor 20. The two portions of the photoconductive layers are in continuous electrical contact. The arrangement of Figure 3 may be operated by employing as the first photoconductor, a material having a maximum sensitivity at the wavelength of the writing signal and as the other photoconductor, a material having a maximum sensitivity at the wavelength of the flooding beam. Since the two photoconductive regions are in series, an interruption of the flood beam effectively opens the circuit in the cell and discontinues operation thereof. Since the usual signal sources are cathode ray phosphors, relatively insensitive to infra-red radiation, the phosphor activated by the flood light may profitably have its maximum sensitivity in the red or infra-red region.

An alternative of the arrangement shown in Figure 3 is one in which a continuous phosphor is employed and a mesh containing two regions of diverse transmission properties is superimposed. The regions may be of the same physical outline as indicated in Figure 3.

While particular embodiments of the invention have been shown and described, it should be understood that the invention is not limited thereto and it is intended in the appended claims to claim all such variations as fall in the true spirit of the present invention.

What I claim as new and desire to secure by Letters Patent of the United States is:

1. In combination, a thin base member of transparent material, said base member having formed therein a lattice of thin light-opaque walls defining a plurality of cells in said member, said walls extending substantially through the thickness dimension of said member, a conductor on the first of the surfaces of said member permitting a substantially unobstructed optical path to each of said cells and forming a first electrical connection common to all of said cells, a conductor penetrating said member in each of said cells, a photoconductive layer applied to said first surface and forming a path connecting the penetrating conductors of each cell to said surface conductor, a transparent conductor coating each cell on the other surface of said member and making electrical contact with said penetrating conductor, an electroluminescent layer applied over said transparent conductors on said other surface and a second transparent conductor applied over said electroluminescent layer forming a second common electrical connection for all of said cells.

2. In the combination set forth in claim 1, means for creating two regions of dissimilar spectral sensitivities in said photoconductive layer, said regions in each of said cells being in electrical series connection between said penetrating conductor and said first common conductor.

3. The combination set forth in claim 1 wherein said photoconductive layer is formed of two materials having dissimilar spectral sensitivities, the portion of the photoconductive layer of one material and the portion of the photoconductive layer on the other material in each of said cells being in electrical series connection between said penetrating conductor and said first common conductor.

4. The combination set forth in claim 1 wherein said base member is of glass and said light-opaque walls are of solder glass.

5. In combination, a thin base member of transparent material, said member having formed therein a lattice of thin light-opaque walls defining a plurality of cells in said member, said walls extending substantially through the thickness dimension of said member and merging into continuous grooves indented on one surface of said member, a conductor embedded in said grooves forming a first electrical connection common to all of said cells, a conductor penetrating said member in each of said cells, a photoconductive member applied to said first surface and connecting the penetrating conductor of each cell to the surface conductor in the grooves bounding each cell, a plurality of transparent conductors each coating one of said cells on the other surface of said member and making electrical contact with said penetrating conductor, an electroluminescent layer applied over said transparent conductor applied over said electroluminescent layer forming a second common electrical connection for all of said cells.

6. The combination set forth in claim 5, wherein said base member is of glass and said light-opaque walls are of solder glass.

7. In combination, a thin base member of transparent material, said member having formed therein a lattice of thin light-opaque walls defining a plurality of cells in said member, said walls extending substantially through the thickness dimension of said member and merging into continuous grooves indented in both surfaces of said member, a conductor embedded in the grooves on a first surface of said member forming a first electrical connection common to all of said cells, a conductor penetrating said member in each of said cells, a photoconductive layer applied to said first surface and connecting the penetrating conductor of each cell to the surface conductor in the grooves bounding said cell, a transparent conductor coating each cell on the other surface of said member, each transparent conductor making electrical contact with said penetrating conductor and being bounded by the grooves on said other surface, an electroluminescent layer applied over said transparent conductors on said other surface and a second transparent conductor applied over said electroluminescent layer forming a second common electrical connection for all of said cells.

8. The combination set forth in claim 7 wherein said penetrating conductor is centrally placed in each of said cells, and wherein said photoconductive layer is formed of two materials having dissimilar spectral sensitivities, the portions of the photoconductive layer of one material lying within the portions of the photoconductive layer of the other material in each of said cells, said portions jointly providing an electrical series connection between said first common conductor and the pentrating conductor.

9. In combination, a thin base member of optically sensitive glass of the kind which may be selectively darkened upon exposure to light, said member having formed therein a lattice of thin darkened walls defining a plurality of cells in said member, said walls extending substantially through the thickness dimension of said member, a continuous conductor on a first surface of said member permitting a substantially unobstructed optical path to each of said cells and forming a first electrical connection common to all of said cells, a conductor penetrating said member in each of said cells, a photoconductive layer applied to said first surface and connecting the penetrating conductor of each cell to said surface conductor, a transparent conductor coating each cell on the other surface of said member, each transparent conductor making electrical contact with said penetrating conductor, an electroluminescent layer applied over said transparent conductors on said other surface and a second transparent conductor applied over said electroluminescent layer forming a second common electrical connection for all of said cells.

10. In combination, a thin base member of optically sensitive glass of the kind which may be selectively darkened upon exposure to light, creating regions which are responsive to selective etching, said member having formed therein a lattice of thin darkened walls defining a plurality of cells in said member, said walls extending substantially through the thickness dimension of said member and merging into continuous grooves etched into both surfaces of said member, a continuous conductor embedded in the grooves on a first surface of said member forming a first electrical connection common to all of said cells, a conductor penetrating said panel in each of said cells, a photoconductive layer applied to said first surface and connecting the pentrating conductor of each cell to the surface conductor in the grooves bounding said cell, a transparent conductor coating each cell on the other surface of said member, each transparent conductor making electrical contact with said penetrating conductor and being bounded by the etched grooves on said other surface, an electroluminescent layer applied over said transparent conductors on said other surface and a second transparent conductor applied over said electroluminescent layer forming a second common electrical connection for all of said cells.

11. The combination set forth in claim 10 wherein said penetrating conductors are formed of conductive layers applied to the walls of holes etched in said member.

References Cited in the file of this patent

UNITED STATES PATENTS

| | | |
|---|---|---|
| 2,650,310 | White | Aug. 25, 1953 |
| 2,792,447 | Kazan | May 14, 1957 |
| 2,818,511 | Ullery et al. | Dec. 31, 1957 |

OTHER REFERENCES

"Transient Voltage Indicator and Information Display Panel," by A. Bramley and J. E. Rosenthal, Review of Scientific Instruments, vol. 24, No. 6, June 1953, pages 471, 472.

"Electroluminescent X-Ray Intensifier," by B. Kazan, R.C.A. Tn. No. 84, December 3, 1957.

"An Improved High-Gain Panel Light Amplifier," by B. Kazan, Proc. of I.R.E., October 1957.

UNITED STATES PATENT OFFICE

CERTIFICATE OF CORRECTION

Patent No. 2,920,232 January 5, 1960

Howard Joseph Evans

It is hereby certified that error appears in the printed specification of the above numbered patent requiring correction and that the said Letters Patent should read as corrected below.

Column 7, after the word "transparent" in line 13, and before "conductor" in line 14, insert -- conductors on said other surface and a second transparent --.

Signed and sealed this 7th day of June 1960.

(SEAL)
Attest:

KARL H. AXLINE
Attesting Officer

ROBERT C. WATSON
Commissioner of Patents